(12) United States Patent
Humphries

(10) Patent No.: US 7,188,336 B2
(45) Date of Patent: Mar. 6, 2007

(54) MULTI-PLATFORM SOFTWARE INTERFACE AND DOCUMENTATION GENERATOR

(75) Inventor: Marshall Lee Humphries, Austin, TX (US)

(73) Assignee: International Bussiness Machines Corporation, Armonk, NY (US)

( * ) Notice: Subject to any disclaimer, the term of this patent is extended or adjusted under 35 U.S.C. 154(b) by 467 days.

(21) Appl. No.: 10/124,554

(22) Filed: Apr. 17, 2002

(65) Prior Publication Data

US 2003/0200348 A1   Oct. 23, 2003

(51) Int. Cl.
*G06F 9/44* (2006.01)
(52) U.S. Cl. .................. 717/123; 717/101
(58) Field of Classification Search ........ 717/101–104, 717/106–108, 114, 115, 136, 137, 120, 123
See application file for complete search history.

(56) References Cited

U.S. PATENT DOCUMENTS

| | | | |
|---|---|---|---|
| 5,617,527 A | 4/1997 | Kressin et al. ............. | 345/840 |
| 5,841,434 A | 11/1998 | Arda et al. ................ | 345/335 |
| 5,892,950 A | 4/1999 | Rigori et al. .............. | 395/705 |
| 5,970,490 A | 10/1999 | Morgenstern ............... | 707/10 |
| 5,991,814 A | 11/1999 | Rzonca et al. ............. | 709/237 |
| 6,078,968 A | 6/2000 | Lo et al. .................... | 710/5 |
| 6,083,276 A * | 7/2000 | Davidson et al. ........... | 717/107 |
| 6,141,660 A | 10/2000 | Bach et al. ................ | 707/103 |
| 6,173,439 B1 | 1/2001 | Carlson et al. ............ | 717/1 |
| 6,198,479 B1 | 3/2001 | Humpleman et al. ...... | 345/329 |
| 6,209,043 B1 | 3/2001 | Sanemitsu .................. | 710/5 |
| 6,209,124 B1 | 3/2001 | Vermeire et al. ........... | 171/1 |
| 6,594,823 B1 * | 7/2003 | Corbin et al. .............. | 717/143 |
| 6,675,370 B1 * | 1/2004 | Sundaresan ................ | 717/106 |
| 2001/0009016 A1 | 7/2001 | Hofmann et al. ........... | 709/219 |

FOREIGN PATENT DOCUMENTS

| | | |
|---|---|---|
| JP | 2244326 A | 9/1990 |
| JP | 408272581 A | 10/1996 |
| JP | 2001056984 | 2/2001 |

OTHER PUBLICATIONS

Vince Carey, "About XML=based Literate Programming for RS," Jun. 3, 2001, [online] accessed Feb. 4, 2005, retrieved from Internet <URL: http://www.biostat.harvard.edu/~carey/old_public_html/Aboutlit.html>, 9 pages.*

(Continued)

*Primary Examiner*—Tuan Dam
*Assistant Examiner*—Eric B Kiss
(74) *Attorney, Agent, or Firm*—Kunzler & Associates

(57) ABSTRACT

An interface definition that specifies the functionality of humanly accessed functions within a software program is parsed into statements by a parser in conjunction with a dictionary. The parsed statements are converted to formatted statements by a plurality of formatters resulting in expression of the interface definition in a plurality of selected formats. The selected formats comprise source code formats and various documentation formats. Files generated from source code formatters, such as "C++" formatters, are included in the software build process and facilitate restricting software development to the specified functionality. Changes to the interface definition are propagated to the selected formats resulting in software functionality that is consistent with the various forms of documentation such as on-line help and printed documentation. The present invention was developed in response to the needs of multi-platform product development and facilitates timely and accurate coordination between software development and documentation efforts.

16 Claims, 4 Drawing Sheets

OTHER PUBLICATIONS

Paul DuBois, "Software Portability with image," Second Edition, Sep. 1996, O'Reilly, pp. iii, iv, 1-14.*
Donald E. Knuth and Silvio Levy, "The CWEB System of Structure Documentation," Jul. 2000, packaged with the CWEB v. 3.61 software product, pp. i, 1-25.*
Donald E. Knuth, "Literate Programming," 1984, The Computer Journal, vol. 27, issue 2, pp. 97-111.*
Markus Öllinger, "mCWEB, an Extension of CWEB for Teams," 1998, [online] accessed Feb. 4, 2005, retrieved from Internet <URL: http://www.literateprogramming.com/mcweb.pdf>, pp. i, ii, 1-39, 77, 189, 380-389.*
Peter Pierrou, "Literate Programming in XML," Dec. 1999, Markup Technologies '99, Philadelphia, PA, pp. 1-19.*
Herbert Schildt, "C/C++ Programmer's Reference," Second Edition, 2000, McGraw-Hill, pp. i, ii, 29.*
C.M. Sperberg-McQueen, "A Simple Yacc/Lex Processor for Sweb, an SGML Tag Set for Literate Programming," 1998, [online] accessed Feb. 1, 2005, retrieved from Internet <URL: http://tigger.uic.edu/~cmsmcq/tech/sweb/swebyacc.html>, 38 pages.*
C.M. Sperberg-McQueen, "SWEB: an SGML Tag Set for Literate Programming," 1996, [online] accessed Feb. 1, 2005, retrieved from Internet <URL: http://tigger.uic.edu/~cmsmcq/tech/sweb/sweb.html>, 38 pages.*
Mark Wroth, "DocBook-Based Literate Programming," Apr. 12, 2001, [online] accessed Feb. 1, 2005, retrieved from Internet <URL: http://www.west-point.org/users/usma1978/36200/LitProg/SGMLWEB/DBLP.pdf>, pp. i, 1-34.*
Mark B. Wroth, "An Experiment in Literate Programming Using SGML and DSSSL," 1999, [online] accessed Feb. 1, 2005, retrieved from Internet <URL: http://www.west-point.org/users/usma1978/36200/LitProg/SGMLWEB/experiment.pdf>, pp. i, 1-38.*
Anonymous, "Method for Managing Applications for Web-Based enterprise Management" Research Disclosure Dec. 1999/1647 428090 A.

* cited by examiner

MULTI-PLATFORM SOFTWARE INTERFACE AND DOCUMENTATION GENERATOR

BACKGROUND OF THE INVENTION

1. The Field of the Invention

The invention relates to automatic generation of software interfaces and user documentation for multi-platform software systems generally. Specifically, the invention relates to generating code interfaces and user documentation for command-line systems targeted to multiple platforms from a common definition.

2. The Relevant Art

Computer networking has increased the interaction and need for interoperability between disparate computing devices and systems. Network-oriented applications are typically required to run on the various platforms that comprise computer networks. Often, the operating systems and processing systems that host and run network-oriented applications have human and programming interfaces with differing philosophies, performance criteria, and objectives.

Creating network-oriented applications such as storage management is a challenge in that users and system administrators expect products to operate consistently regardless of the delivery platform, while also maintaining the expectations and strengths of the platforms to which they are familiar. The challenge of delivering well documented applications that function consistently on multiple platforms while facilitating platform-specific expectations is exacerbated by the number of personnel involved in creating and delivering software products.

FIG. 1 is a simplified depiction of a traditional software development process 100. One or more product architects 110, such as marketing and development managers, develop a product specification 112. From the product specification, more detailed specifications are created for specific software functions particularly those involving human interaction. The detailed specifications and/or the product specifications are typically communicated to multiple individuals and/or teams in the form of design documents.

As shown in FIG. 1, each software developer 120, on each platform, interprets the specification 112 and implements the various software functions as software code 122, subject to platform and project timeline constraints. After the software is coded, the information developers 130 on each platform document the performance of the software in the form of on-line help 132 and printed documents 134. The code, documentation, and other deliverables are combined into the initial versions of a product 140. The initial versions of the product 140 are tested by quality assurance personnel 150 to reveal coding errors and ambiguities, which are addressed by the software developers 120 and information developers 130 as expeditiously as possible.

In some cases, the product specification 112 must be modified, resulting in adjustments to the product on multiple platforms. Changes and adaptation are difficult in that many parties are involved, and product deadlines restrict the number of changes that can occur. As implied by FIG. 1, the sequentially dependent nature of the traditional design, build, test, and documentation processes result in relatively long development and release cycles for the product 140.

In addition to normal pressures of developing, testing, and releasing products in a timely fashion, there are several challenges and difficulties in creating documentation that is accurate and consistent. Software documentation is most useful when the documented functionality is consistent with the actual functionality of the product. Typically, the product specification and design documents, if any, are technically oriented and targeted toward the engineers and technicians who develop and test the product.

In contrast, the information developers 130 are required to create documentation that is understandable by a less technical user yet precise enough to be useful to highly technical users. Often the gap between the technical specification and the actual users experience requires information developers to collect information by a variety of means such as testing the product, communicating with the developers, referencing the platform specific source code, and conjecturing on the intent of the designers.

Documentation is often considered secondary in importance, despite the role of documentation in creating a successful user experience. This is particularly so among novice users. Information development is often put off or neglected under the pressure of product release deadlines.

The challenges of documenting software functionality are further exacerbated in multi-platform software products in that the authoring tools, human interface designs, programming interfaces, and the actual functionality of the product being documented differ from platform to platform. Typically, several information developers are required to document the various versions of software in the formats appropriate for each platform.

Obviously, the aforementioned design processes and methodologies are fraught with error, as well as replicated effort, resulting in poorly documented products that function differently on various platforms. What is needed is an apparatus and method to generate software interfaces and documentation that is automated and controllable from a central source. The method must be flexible enough to support expected platform differences while constrained enough to prevent unnecessary documentation and functionality differences. Such a method would preferably facilitate parallel development and reveal inconsistent interpretations of functional specifications relatively easily.

OBJECTS AND BRIEF SUMMARY OF THE INVENTION

The apparatus of the present invention has been developed in response to the present state of the art, and in particular, in response to the problems and needs in the art that have not yet been fully solved by currently available multi-platform software development means and methods. Accordingly, it is an overall object of the present invention to provide an improved apparatus and method for developing software interfaces, particularly command line interfaces, and associated documentation that overcomes many or all of the above-discussed shortcomings in the art.

To achieve the foregoing object, and in accordance with the invention as embodied and broadly described herein in the preferred embodiments, an improved apparatus and corresponding method is presented for generating software interfaces and documentation for a plurality of target platforms from a central definition. The apparatus facilitates desired platform differences while minimizing unnecessary platform differences.

The prior art method was linear and required multiple iterations of designing, reading, and writing, as well as multiple communication steps between architects, software developers, technical writers, and customers. In the present method, all of the human work is done in the first step—creating the interface definition. Once the interface definition is created, the tool automatically generates code, online help, and product documentation without requiring further human interaction. The code and documentation generated by present invention is then passed into the product build process and incorporated into the final product without requiring additional human interaction. The present method is much more efficient and much less prone to error than the prior art.

One important aspect of the present invention is the methodology that it enforces on each of the humans involved in the software production process. The present invention enables rapid cross-platform development—a traditionally very tedious and error prone process. Prior art methods require separate design, code development, and documentation processes, typically performed by different groups of people. With the present invention, all of the humans involved work together to produce a design, and once all of the design work is done, generation of the documentation and interface code on multiple platforms is entirely automated.

The apparatus of the present invention includes an interface definition and a parser configured to receive that interface definition and parse that interface definition into statements. The parser references a dictionary that defines the syntax for valid statements. The parsed statements are converted to selected formats by a set of formatters including documentation formatters and at least one source code formatter.

The source code formatters convert the parsed statements into a format usable within a software development environment. For example, in one embodiment, the source code formatters convert the parsed statements into "C++" header files. The documentation formatters convert the parsed statements to various on-line and printed documentation formats such as SGML, PDF, RTF, HTML, and the like. In an example discussed herein, the interface definition is an XML file, the dictionary is a DTD file, the parser is an XML parser, and the formatters are XSL converters.

In one embodiment, the interface definition is maintained in a source code control system and updated in the same manner as source code. The software build process is modified to generate the source code files, thereby constraining development to the functions and parameters defined in the interface definition. The documentation files are also generated and may be included in the software deliverables, as on-line help files, for example.

The present invention is a major improvement over the prior art methodologies. In many cases, development looks at upfront design work as a waste of time because it takes away from time that could be "better" spent coding. The result is poorly designed code. With the present invention, it is well worth the developer's time to invest the upfront time in design, because once the design is done, the tool generates the interface code automatically. Design changes may be converted to code changes automatically to facilitate timely testing of the product on multiple platforms. In certain embodiments, the automation includes invocation of an automated test procedure further expediting the development process.

The present invention maintains consistency between the human interface of a software program and various forms of documentation on a plurality of computing platforms. The files generated for each platform may have unique functionality that is desired for that platform. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
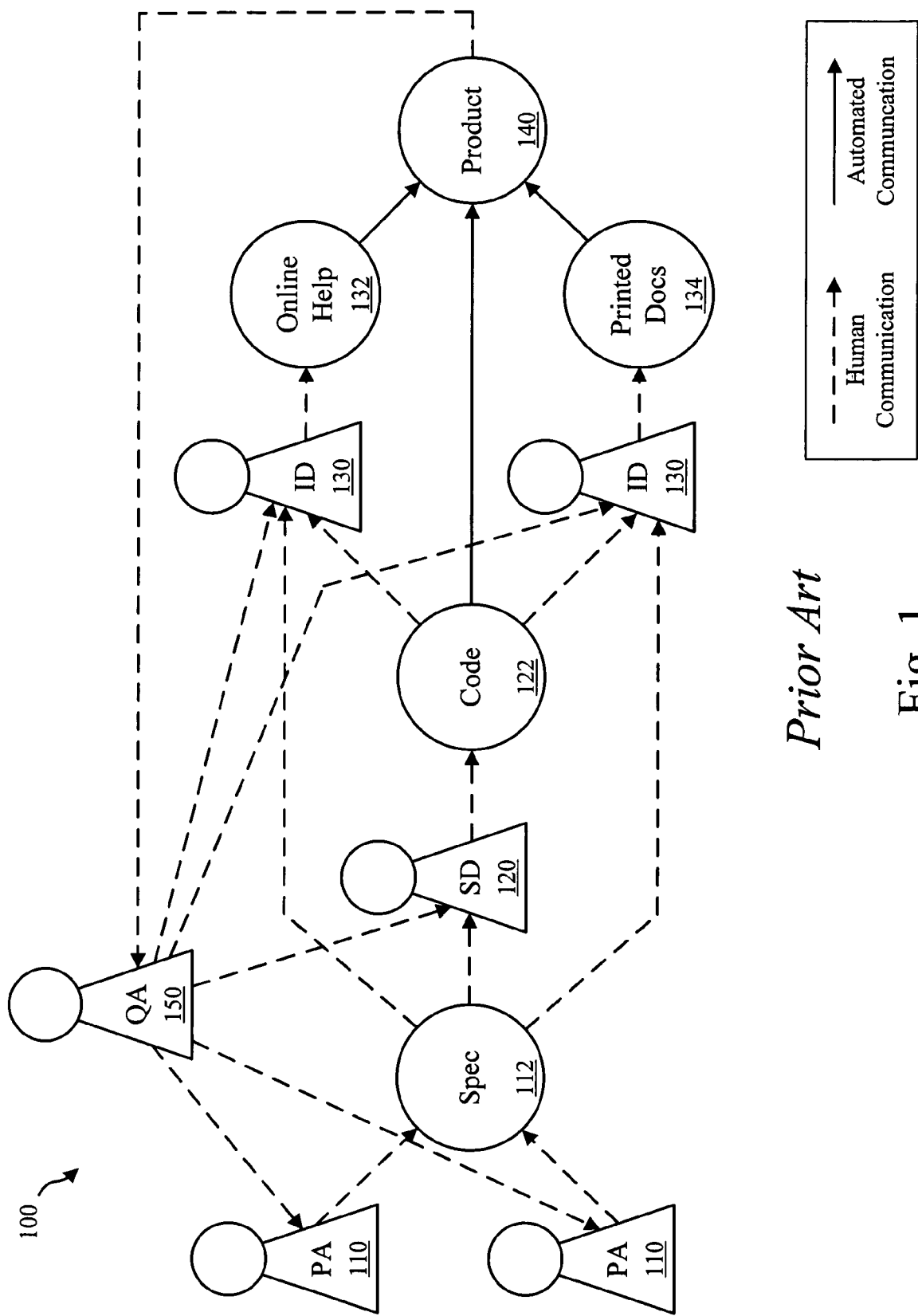
FIG. 1 is a block diagram illustrating a typical prior art software development process.
Figure 2:
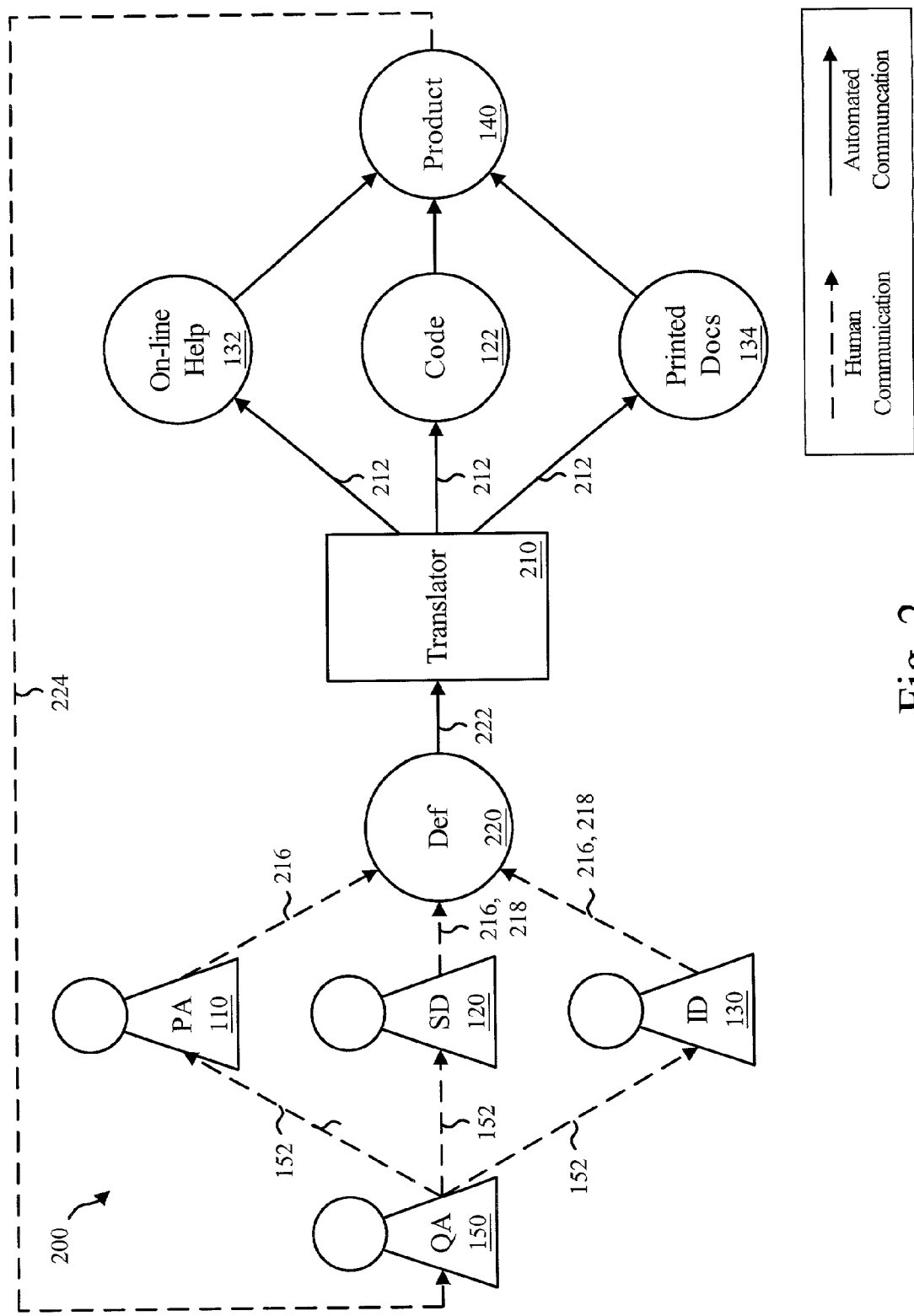
FIG. 2 is a block diagram illustrating a streamlined software development process in accordance with the present invention.

Referring to FIG. 2, a streamlined software development process 200 addresses many of the problems and issues inherent in prior art software development processes as discussed in the background section. The software development process 200 incorporates an interface translator 210 to simplify, constrain, and centralize the software development and documentation efforts associated with developing software products. The interface translator 210 streamlines and reduces the communication required to deliver software products, particularly multi-platform software products.

As depicted in FIG. 2, human communication may be concentrated and focused on creating an initial design 216 and design updates 218 to an interface definition 220. For example, the product architects 110 may coordinate with the software developers 120 and the information developers 130 to create the initial design 216 of the interface definition 220. The design updates 218 may be used to correct any errors revealed by the streamlined software development process 200 after the initial design 216 is completed. The design updates 218 provide a feedback path that facilitates correction and improvement of the desired product on multiple platforms.

The translator 210 receives the interface definition 220 as a series of raw statements 222 and generates a series of translated statements 212 to provide the on-line help 132, the printed documentation 134, and the source code 122. In one embodiment, the source code 122 is a "C++" header file containing a structure that defines the commands and parameters of a command line interface. Automated generation of the on-line help 132, and the printed documentation 134 from the interface definition leverages the work of the information developers 130 to a potentially large number of documentation formats and delivery platforms. Fewer information developers 130 may be required or preferably the information developers 130 may be free to provide more comprehensive documentation such as information on platform-specific features and capabilities.

Once generated, the on-line help 132, printed documentation 134, and source code 122, may be combined into the product 140. Multiple versions of the online help 132, the printed documentation 134, and the source code 122 (for example, one or more for each operating system platform the product is intended to run on) may be produced from a single automatic transform. Code that is not directly related to the interface definition 220 may be developed in the traditional fashion and included in the code 122 and the product 140.

Once various software and documentation components are generated and combined into the product 140, the product is sent 224 for testing by or under the direction of the quality assurance personnel 150 to reveal errors and ambiguities 152. Once discovered, the errors and ambiguities are communicated to the appropriate personnel, such as the software developers 120 and the information developers 130, who in turn create design updates 218 to the interface definition 220. The software development process 200 continues in this manner, testing 150 and recoding 122 as shown in FIG. 2 until the quality assurance personnel 150 determine that the product meets the desired level of completeness and lack of errors. The product is then ready to be shipped to customers/users.

One advantage of the streamlined software development process 200 is that human communications are concentrated and focused on creating the initial design 216 and the design updates 218 to the interface definition 220. Concentrated and focused human communications result in better solutions from development personnel.

Another advantage of the streamlined development process 200 is that the design efforts are more readily leveraged to multiple platforms. The automated manner in which the various documentation and code components are generated facilitates multiple platform development with little additional effort.

Yet another advantage of the streamlined software development process 200 is that human and automated communications are separated to the domains for which they are best suited. Human communications are focused on the creative process, while automated communications are relegated to repetitive and tedious tasks. The structure of the communication processes including a feedback loop that minimizes the number of transitions between human and automated communication facilitates efficient refinement of the product 140.

Figure 3:
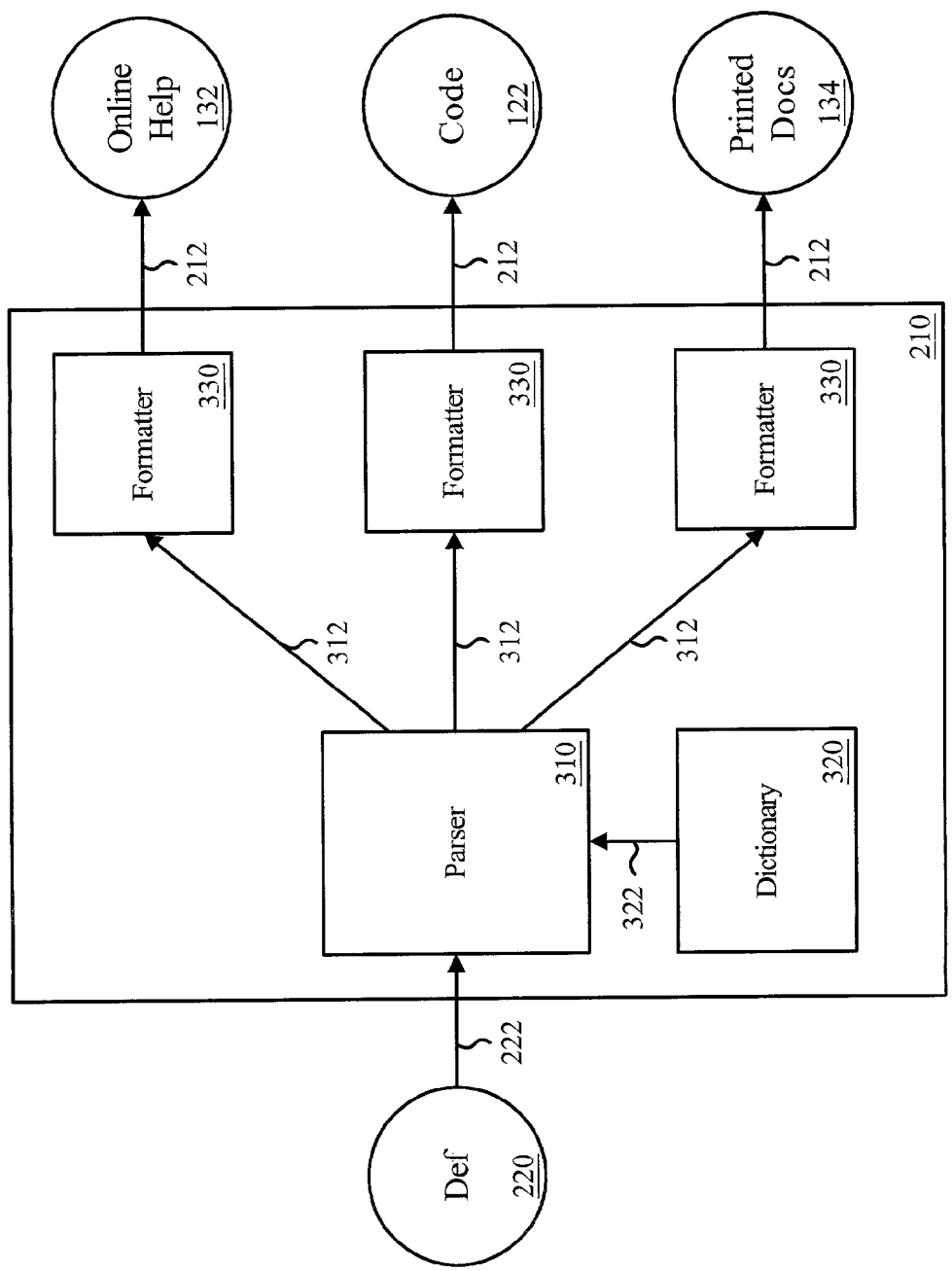
FIG. 3 is a block diagram illustrating one embodiment of an interface translation apparatus of the present invention.

FIG. 3 illustrates one embodiment of the interface translator 210 of the present invention. The depicted interface translator 210 includes a parser 310, a dictionary 320, and a plurality of formatters 330. The interface translator 210 receives the interface definition 220 as the series of the raw statements 222 and generates the series of formatted statements 212 to provide the on-line help 132, the printed documentation 134, and the source code 122.

TABLE 1

```
<?xml version="1.0" encoding="UTF-8" ?>
<!ELEMENT commands (command+) >
<!ELEMENT command (name, codename, option*, arg*, examples) >
<!ATTLIST command common CDATA "no"
                  platforms CDATA "all" >
<!ELEMENT name (#PCDATA) >
<!ELEMENT codename (#PCDATA) >
<!ELEMENT option (#PCDATA) >
<!ATTLIST option default CDATA "no" >
<!ELEMENT arg (arg_name, arg_description) >
<!ATTLIST arg optional CDATA "no" >
<!ELEMENT arg_name (#PCDATA) >
<!ELEMENT arg_description (#PCDATA) >
<!ELEMENT command_description (#PCDATA) >
<!ELEMENT examples (example+) >
<!ELEMENT example (task, syntax) >
<!ELEMENT task (#PCDATA) >
<!ELEMENT syntax (#PCDATA) >
```

Within the interface translator 210, the parser 310 receives the series of the raw statements 222 and provides a series of parsed statements 312. In the prefened embodiment, the parser 310 references a dictionary 320 that defines the structure and acceptable content 322 for the parsed statements 312. In one embodiment, invalid statements within the interface definition are logged to an error file (not shown). The dictionary 320 may be selected from a schema file. Table 1 shows a simplified example of one embodiment of the dictionary 320 which is a DTD file referenced by an XML parser. In the example of table 1, the DTD file defines the structure and allowable content 322 for statements describing the name, codename, options, arguments, examples, and syntax of interface functions.

The series of parsed statements 312 are received by the formatters 330 and are formatted to provide the translated statements 212. In one embodiment, the formatters 330 are selectively invoked by the parser 310, thereby facilitating platform-specific statements in the interface definition 220. In one embodiment, the formatters 330 are XSL files invoked by an XML parser, and the XSL files correspond to the SGML, PDF, RTF, HTML, and ASCII text formats.

Figure 4:
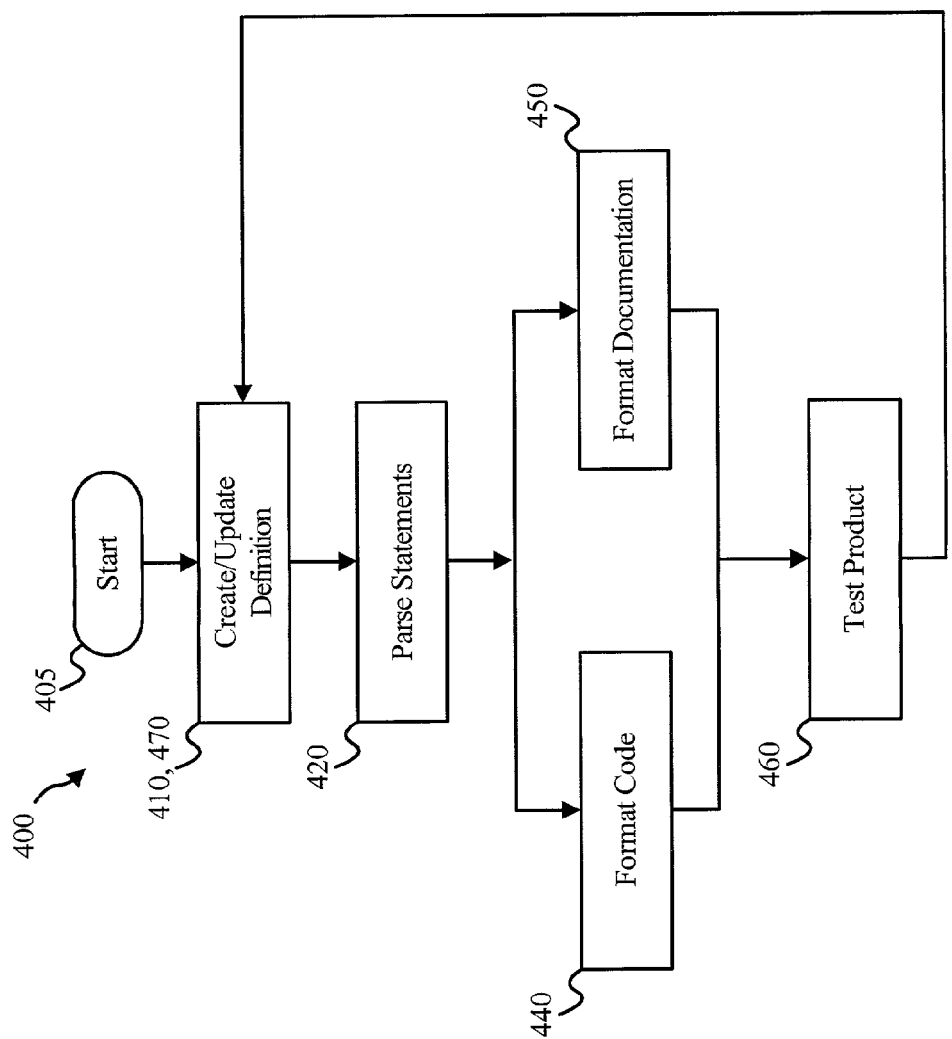
FIG. 4 is a flow chart illustrating one embodiment of an interface translation method of the present invention.

FIG. 4 is a flow chart illustrating one embodiment of an interface translation method 400 of the present invention. The interface translation method 400 facilitates multi-platform software development with consistent documentation. The method 400 may be conducted independently of, or in conjunction with, the interface translator 210 of FIG. 3.

The interface translation method begins 405 and proceeds to creating 410 an interface definition such as the interface definition 220. The method 400 then proceeds to parsing 420 the interface definition into statements such as the parsed statements 312. In one embodiment, parsing the interface definition into statements includes referencing a dictionary, such as the dictionary 320, which defines the legal vocabulary and syntax for the interface definition. Upon proper parsing into statements, the method 400 proceeds to automatically formatting 440 the statements into code such as the code 122, and automatically formatting 450 the statements into documentation such as the on-line documentation 132 and the printed documentation 134.

After formatting 440 and 450, the interface translation method 400 proceeds to testing 460 the resulting product. In one embodiment, testing 460 comprises launching a build process, followed by conducting an automated test sequence to detect errors, followed by additional human testing. In one embodiment, both the build process and automated test sequence reveal discrepancies between the code 122 and the interface definition 220.

After testing, the method 400 loops to updating 470 the interface definition to correct the detected errors. As depicted, the interface translation method 400 indefinitely repeats the process of parsing, formatting, testing, and updating resulting in continued improvement of the resulting product such as the product 140. The method 400 ends at the termination of the product life-cycle, or at a point where the development of the product ends.

One advantage of the present invention is that multi-platform development is greatly eased. First of all, a common consistent source is used. Traditionally, porting a product to an additional platform is difficult in that the source code must be copied and modified to suit the requirements of the additional platform. In the meantime, changes may be occurring to the original source code thus compounding the maintenance, administrative and testing challenges associated with releasing a software product.

With the present invention, the focus is on creating a solid interface definition including those aspects that are unique to certain platforms. The interface definition is maintained in one location and all editing occurs on a single master copy.

Support for additional platforms may be added by adding additional formatters 330 to the interface translator 210. When a problem occurs on a specific platform, the translated statements are referenced to verify proper translation of the interface definition 220. If proper translation is occurring, corrections are made to interface definition 220. Otherwise, the formatter 330 is changed to correct the problem.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for maintaining consistency between the human interface of a software program and various forms of documentation on a plurality of computing platforms, the method comprising:
    creating an XML interface definition that defines only the functionality of the humanly accessed software functions within a program;
    automatically converting the XML interface definition to selected formats, the selected formats comprising C++ header file source code containing a structure that defines the commands and parameters of a command line interface and a plurality of documentation formats; and
    validating the XML interface definition by referencing a dictionary configured to specify a set of valid statements, the dictionary selected from a schema file; and
    manually creating source code for the program using the C++ header file source code.

2. The method of claim 1, wherein converting the interface definition to selected formats comprises parsing the interface definition into statements and formatting the statements into the selected formats.

3. The method of claim 2, further comprising combining the selected formats into a plurality of platform specific products.

4. The method of claim 2, further comprising combining the selected formats into a product.

5. The method of claim 4, further comprising testing the product to detect errors.

6. The method of claim 5, further comprising updating the interface definition to correct the detected errors.

7. The method of claim 1, wherein converting the interface definition to a source code format comprises generating a source code file.

8. The method of claim 1, wherein the plurality of documentation formats are selected from SGML, PDF, RTF, HTML, XML, and ASCII text formats.

9. The method of claim 1, wherein creating the interface definition comprises specifying platform specific definitions and converting the interface definition comprises converting platform specific definitions exclusively to specific formats.

10. An apparatus for maintaining consistency between the human interface of a software program and various forms of documentation on a plurality of computing platforms, the apparatus comprising:
    a parser that receives an XML interface definition that defines only the functionality of the humanly accessed software functions within the software program and automatically parse the XML interface definition into statements, update the XML interface definition to correct detected errors, and validate the XML interface definition by referencing a dictionary configured to specify a set of valid statements, the dictionary selected from a schema file;
    a plurality of formatters that automatically convert the statements to selected formats, the plurality of formatters comprising documentation formatters and a source code formatter, the source code formatter configured to convert the XML interface definition to C++ header file source code containing a structure that defines the commands and parameters of a command line interface, wherein the C++ header file source code is used to manually create source code for the software program, the documentation formatters configured to convert the XML interface definition to a plurality of documentation formats comprising on-line help formats selected from SGML and XML formats and an RTF printed documentation format.

11. The apparatus of claim 10, wherein the parser is configured to selectively invoke the plurality of formatters, each formatter thereof corresponding to a specific format.

12. The apparatus of claim 10, wherein at least one formatter of the plurality of formatters comprises an XSL file.

13. The apparatus of claim 10, wherein at least one formatter of the plurality of formatters comprises a script driven executable.

14. The apparatus of claim 10, wherein the interface definition includes platform specific statements and the parser is further configured to exclusively activate specific formatters.

15. The apparatus of claim 10, wherein the interface definition is maintained in a source code control system.

16. A system for maintaining consistency between the human interface of a software program and various forms of documentation on a plurality of computing platforms, the system comprising:
    an XML interface definition that defines only the functionality of the humanly accessed software functions within the software program and is maintained within a source code control system;
    an XML parser that automatically parses the XML interface definition into statements, update the XML interface definition to correct detected errors, and validate the interface definition by referencing a dictionary configured to specify a set of valid statements, the dictionary selected from a schema file;
    a plurality of formatters that automatically convert the statements to selected formats, the plurality of formatters comprising documentation formatters and a source code formatter, the source code formatter configured to convert the XML interface definition to C++ header file source code containing a structure that defines the commands and parameters of a command line interface, wherein the C++ header file source code is used to manually create source code for the software program, the documentation formatters configured to convert the XML interface definition to a plurality of documentation formats comprising online help formats selected from SGML and XML and an RTF printed documentation format;
    a build process that automatically builds a software product from the C++ header file source code and the manually generated source code; and
    a test sequence that automatically detects errors in the software product.

* * * * *